Re. 25291
Jan. 28, 1958   L. L. CHARLSON   2,821,171
FLUID PRESSURE DEVICE AND VALVE
Filed June 8, 1956   3 Sheets-Sheet 1
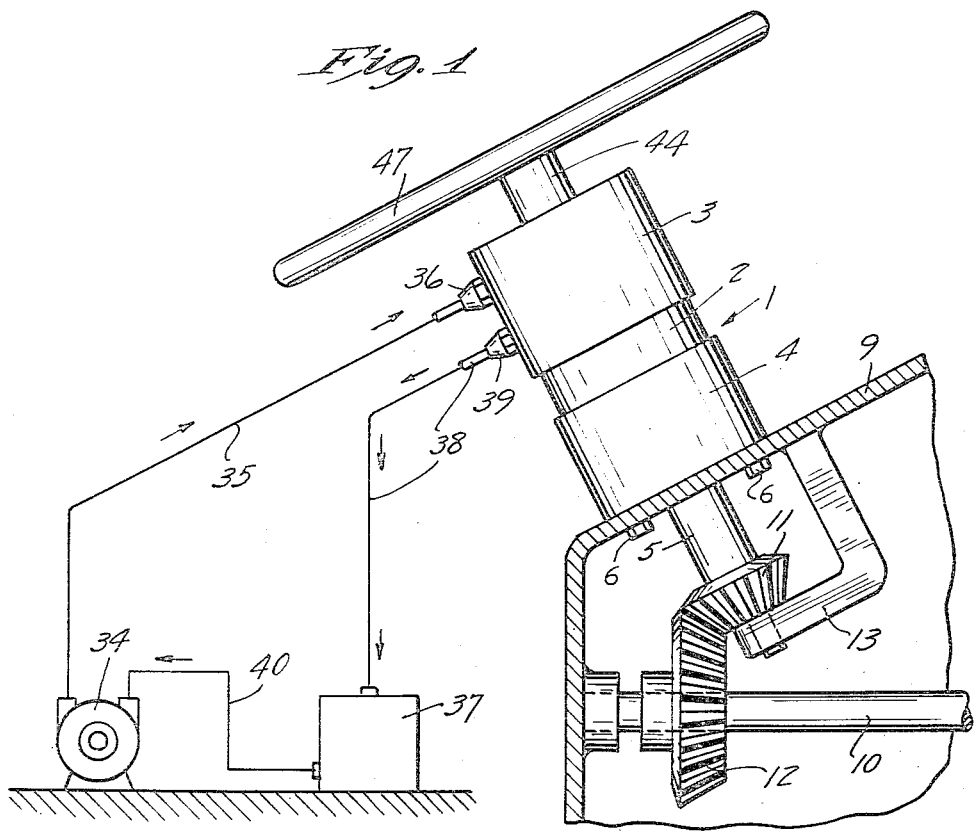
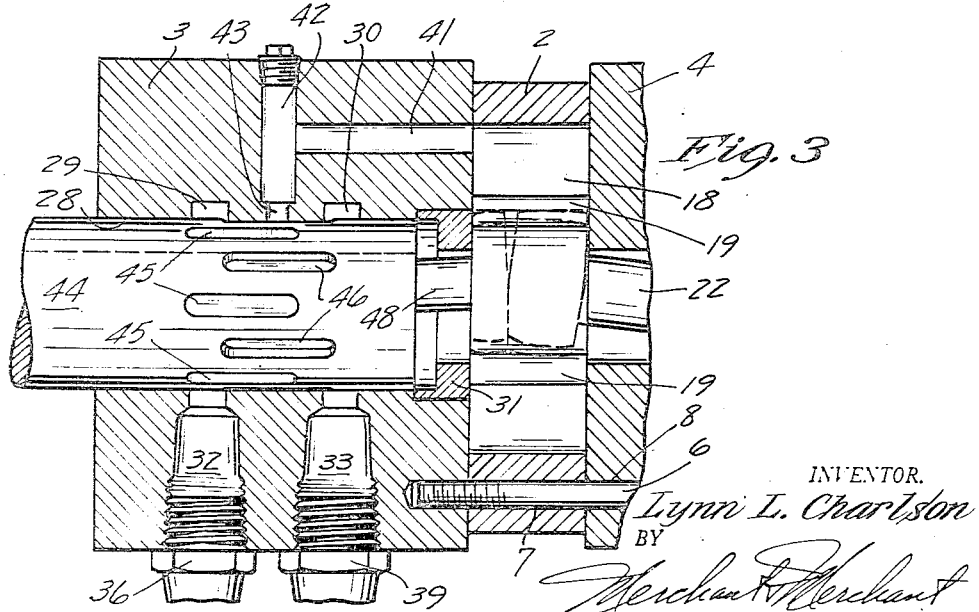
INVENTOR.
Lynn L. Charlson
BY
Merchant & Merchant
ATTORNEYS Jan. 28, 1958     L. L. CHARLSON     2,821,171
FLUID PRESSURE DEVICE AND VALVE
Filed June 8, 1956     3 Sheets-Sheet 2
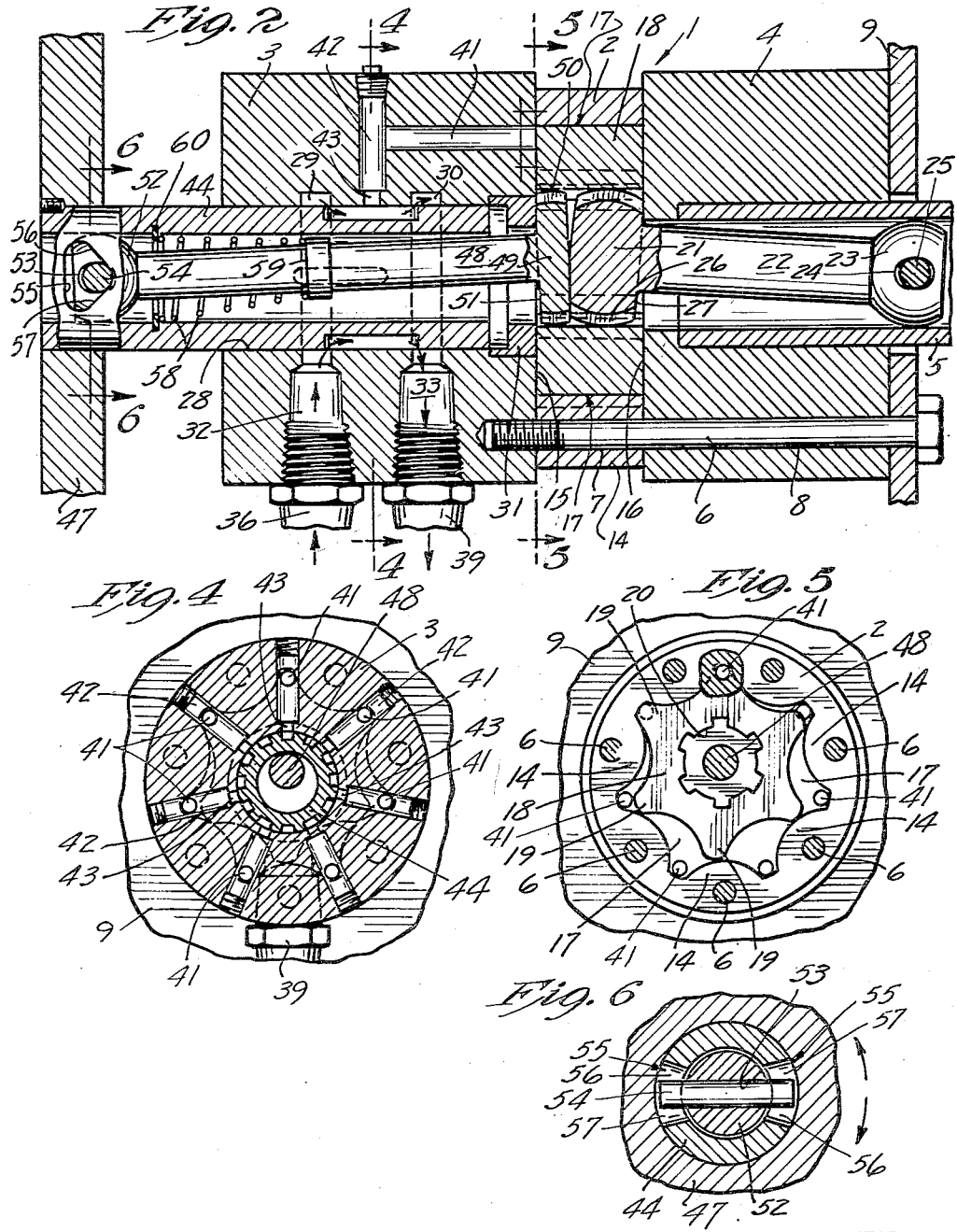
INVENTOR.
Lynn L. Charlson
BY
Merchant & Merchant
ATTORNEYS

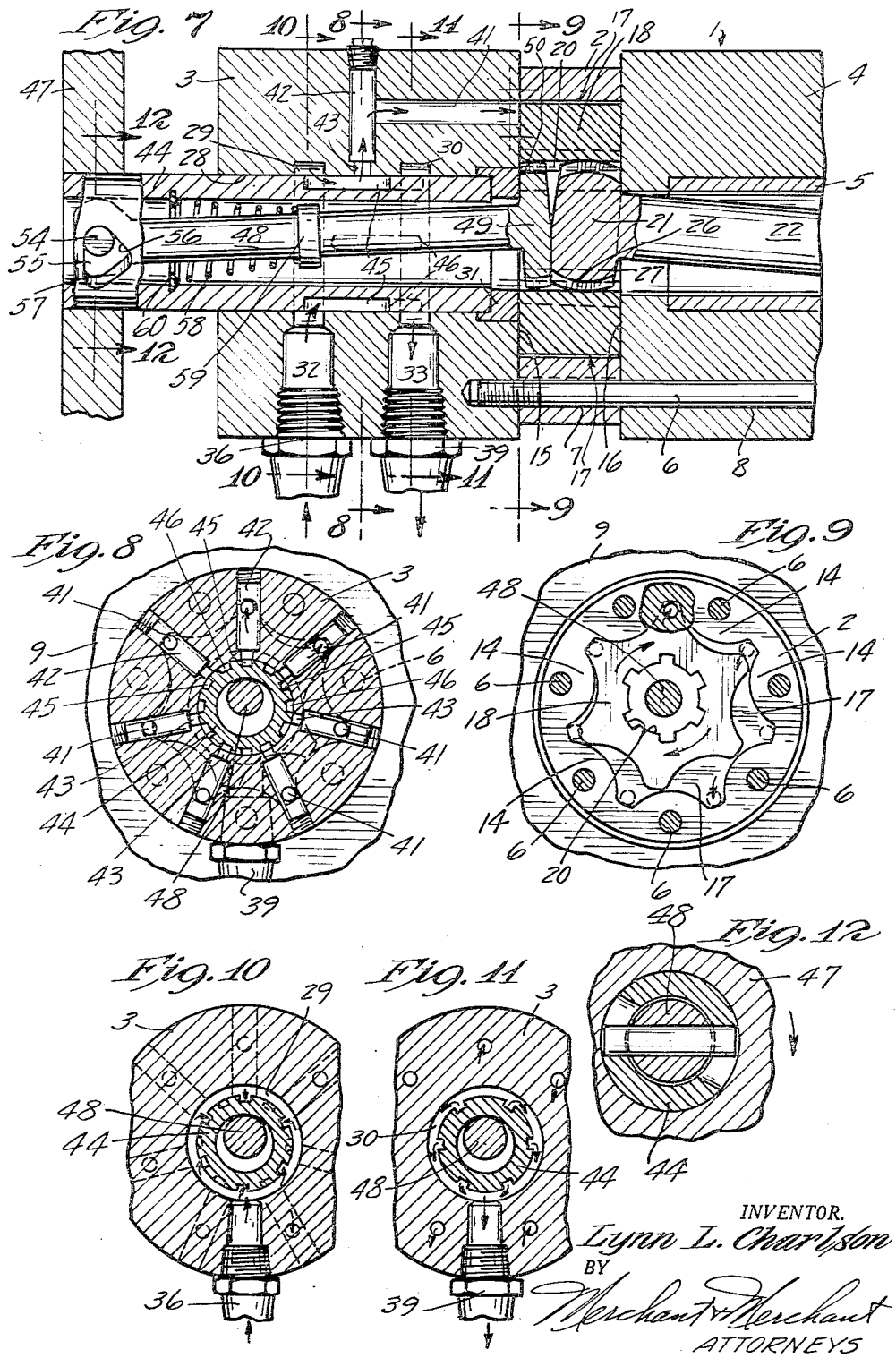

United States Patent Office 2,821,171
Patented Jan. 28, 1958

2,821,171

FLUID PRESSURE DEVICE AND VALVE

Lynn L. Charlson, Minneapolis, Minn.

Application June 8, 1956, Serial No. 590,314

15 Claims. (Cl. 121—39)

My invention relates generally to fluid pressure apparatus, and more particularly to rotary fluid pressure devices such as rotary pumps, motors and the like.

More specifically, my invention relates to rotary fluid pressure operated motors utilized for the purpose of delivering relatively high torque output at a relatively low output speed.

An important object of my invention is the provision of a rotary fluid pressure motor of the type set forth in which the torque output is delivered smoothly and evenly under various speeds of operation.

Another object of my invention is provision of a device of the above type which can be easily and quickly installed in the steering system of a vehicle as a portion of the steering rod thereof, and which, when in an inoperative condition, will permit normal manual steering of the vehicle with a minimum of restriction.

Still another object of my invention is the provision of a fluid pressure operated motor which is relatively inexpensive to produce and which has a minimum of moving parts.

Another object of my invention is the provision of a fluid motor having an annular internally toothed stator and an externally toothed rotor having a less number of teeth than said stator and in meshing engagement therewith for orbital and rotary movements relative thereto, and of novel means for transferring rotary movement of said rotor to a rotary output shaft irrespective of the orbital movement of the rotor.

Another object of my invention is the provision of a fluid motor of the type set forth having novel control valve mechanism whereby the motor may be operated in forward and reversed directions as desired.

In a specific sense, I utilize fluid pressure operated components of the type disclosed in the United States Patent No. 1,682,563 issued August 28, 1928, to Myron F. Hill. However, in my novel arrangement, the outer, internally toothed member is stationary and the inner member partakes of a hypocycloidal movement therein and travels in an orbit about the axis of the stationary member. Rotation of the inner member or rotor is determined by the difference in the number of teeth in said members. Hence, if the outer stationary member has seven teeth and the rotary inner member has six teeth, the inner member will rotate one-sixth turn on its own axis with each full cycle of orbital travel about the axis of the outer stationary member. Thus a relatively low speed, high torque output is achieved in such an arrangement.

The above and still further highly important objects and advantages of my invention will become apparent from the following detailed specification, appended claims, and attached drawings.

Referring to the drawings, which illustrate the invention, and in which like characters indicate like parts throughout the several views:

Fig. 1 is a view partly in diagram and partly in side elevation of a vehicle steering mechanism incorporating my invention, some parts being broken away and some parts shown in section;

Fig. 2 is a an enlarged fragmentary view in axial section of the fluid pressure motor, driving connections and valve mechanism of my invention, the valve mechanism being shown in a neutral position;

Fig. 3 is an enlarged fragmentary detail, of a portion of Fig. 2 but showing a portion of the valve mechanism thereof in side elevation;

Fig. 4 is a transverse section taken on the line 4—4 of Fig. 2 on a reduced scale;

Fig. 5 is a similarly reduced cross section taken on the irregular line 5—5 of Fig. 2;

Fig. 6 is a fragmentary detail in transverse section taken substantially on the line 6—6 of Fig. 2;

Fig. 7 is a view corresponding to Fig. 2 but showing a different position of some of the parts;

Fig. 8 is a transverse section taken on the line 8—8 of Fig. 7, on a reduced scale;

Fig. 9 is a similarly reduced transverse section taken on the irregular line 9—9 of Fig. 7;

Fig. 10 is a transverse section taken on the line 10—10 of Fig. 7, on a reduced scale, some parts being broken away;

Fig. 11 is a fragmentary transverse section, taken on the line 11—11 of Fig. 7 on a reduced scale; and Fig. 12 is a fragmentary transverse section taken on the line 12—12 of Fig. 7.

In the preferred embodiment of the invention illustrated, a generally cylindrical casing indicated in its entirety by the numeral 1, is shown as comprising an intermediate section 2 and end sections 3 and 4, the end section 3 being in the nature of a valve body, and the end section 4 providing a bearing for a drive shaft element 5. The several sections 2, 3 and 4 are rigidly held together in axial alignment by circumferentially spaced machine screws or bolts 6 which extend through aligned openings 7 and 8 in the intermediate section 2 and end section 4 respectively, and which are screw threaded into the adjament end portion of the end section 3. For the purpose of the present example, the machine screws 6 are shown in Fig. 1 as being utilized to mount the unit 1 on a suitable wall or frame portion 9 of an automotive vehicle such as a tractor or the like, not shown. A rotary shaft 10 is coupled to the drive shaft 5 for common rotation therewith by bevel gears 11 and 12 mounted on the outer end portion of the drive shaft 5 and on the adjacent end of the shaft 10 respectively. The numeral 13 indicates an outboard bearing bracket for supporting the extreme outer end of the drive shaft element 5. The shaft 10 may be assumed to be coupled to the dirigible wheels of the tractor, not shown, in the usual manner. The connections between the drive shaft element 5 and the dirigible wheels, in themselves not comprising the instant invention, detailed showing and description thereof is not deemed necessary. Hence, for the sake of brevity such showing and description is omitted. Obviously, the drive shaft element 5 may, if desired, form an extension of the shaft 10, thus dispensing with the necessity for the bevel gears 11 and 12.

The intermediate section 2 is in the nature of an annular internally toothed motor stator, the internal teeth thereof being indicated by the numeral 14. The inner toothed surface of the intermediate section or stator 2 cooperates with the adjacent end wall surfaces 15 and 16 of the valve body 3 and bearing end section 4 respectively to define a chamber 17, in which is contained a rotor 18. The rotor 18 is formed to provide a plurality of teeth 19 preferably one less in number than the teeth 14 of said stator but of the same pitch thereof, so that the same are adapted to achieve intermeshing engagement. The tooth structures of the teeth 14 and 19 are such that, when one or more of the rotor teeth 19 are in full meshing engagement with an adjacent tooth 14, the others of said teeth 19 have frictional sealing engagement with adjacent teeth 14 of the stator 2. As above indicated, the tooth structure is of the type disclosed in the Hill patent above identified, and it is believed that further detailed description thereof is unnecessary. However, for the purpose of the present example, it will be noted that the intermediate section or stator 2 is provided with seven internal teeth 14 whereas the rotor 18 is provided with one less or six teeth 19. Moreover, the section 2 being stationary, the rotor 18, being eccentrically mounted in the stator 2 must travel in an orbit about the axis of the stator 2. In other words, the rotor 18 partakes of a hypocycloidal movement within the stator 2. It will be further noted that, as the rotor 18 moves in its orbit in a counterclockwise direction with respect to Figs. 5 and 9 about the axis of the stator 2, rotary movement is imparted thereto in a clockwise direction with respect to Figs. 5 and 9. Furthermore, the stator teeth 14 being seven in number and the rotor teeth 19 being six in number, the rotor 18 will rotate in said clockwise direction 1/6 revolution about its own axis for each full 360° cycle of orbital movement in said counterclockwise direction about the axis of said stator 2.

The rotor 18 has a splined axial opening 20 therethrough which contains the inner enlarged head 21 of a drive link 22 the outer end of which is formed to provide a ball segment 23. The ball segment 23 is provided with a transverse opening 24 through which extends a pin 25 the opposite ends of which are mounted in diametrically opposed portions of the tubular drive shaft 5. The head 21 is provided with teeth 26 that mesh with the spline of the opening 20, the teeth 26 being longitudinally arcuate to permit rocking or tilting movements of the drive link 22 toward and away from the axis of the rotor 18. The transverse opening 24 is shaped to permit limited universal swinging movement of the drive link 22 with respect to the drive shaft element 5, and the pin 25 transmits rotary movement of the drive link 22 imparted thereto by the rotor 18 during its orbital movement, to the drive shaft element 5. With reference to Figs. 2, 3 and 7, it will be seen that the enlarged head 21 of the drive link 22 is of considerably less axial length than that of the splined opening 20 of the rotor 18. It will further be noted that one end 27 of the head 21 engages the adjacent end wall surface 16 of the end section 4, this engagement limiting axial movement of the drive link 22 and drive shaft element 5 outwardly with respect to the end section 4.

The end section or valve body 3 is provided with a central opening 28 that is coaxial with the intermediate section or stator 2 and the drive shaft element 5, and a pair of axially spaced annular channels 29 and 30 which open radially inwardly to the central opening 28. At its inner end, the axial opening 28 is counterbored to receive an annular thrust collar 31 the purpose of which will hereinafter become apparent. The valve body 3 further defines an inlet port 32 and an outlet port 33 the former of which is adapted to be connected to a pump 34 through a fluid line 35 and a conventional conduit fitting 36 screw threaded into the valve body 3. With reference particularly to Figs. 1 and 2 it will be seen that the outlet or discharge port 33 communicates with a fluid reservoir 37 by means of a conduit 38 and a conventional fitting 39 therefor, said fitting 39 being screw threaded into the valve body 3. With reference particularly to Fig. 1, it will be seen that a conduit 40 extends from the fluid reservoir 37 to the pump 34 to provide a complete fluid system for the motor.

The valve body 3 is provided with a plurality of axially extending fluid passages 41 each of which communicates with the fluid motor chamber 17 between a different pair of the internal teeth 14 of the stator 2, preferably adjacent the bases of the teeth 14. The opposite end of each fluid passage 41 communicates with a radial passage 42 which extends radially inwardly and communicates with the bore or axial opening 28 in the valve body 3 as indicated at 43. With reference to Figs. 2, 3 and 7 it will be seen that the inner ends 43 of the fluid passages 42 are centrally located between the annular channels 29 and 30.

A tubular valve element 44 is mounted for limited axial and rotary movements in the bore 28 of the valve body 3 and is provided with a plurality of circumferentially spaced axially extending, radially outwardly opening recesses or channels 45 and 46. The channels 45 and 46 are equal in length but axially offset, see particularly Fig. 3. Also, as there shown, each of the channels 46 is of a length whereby, in an inoperative position of the valve element 44, the opposite ends of each channel 46 communicate with the circumferential channels 29 and 30 of the valve body. Thus, when the valve element 44 is in its inoperative position, fluid pumped to the inlet port 32 by the pump 34 is fed directly to the outlet or discharge port 33 and from thence to the reservoir 37. Inasmuch as the fluid system is not a closed system, passages 42 communicating with any one of the channels 45 or 46 when the valve element 44 is in its inoperative position, no pressure is applied to the motor chamber 17, because of the escape of said pressure through the outlet port 33. Movement of the tubular valve element 44 from its neutral or inoperative position of Figs. 2 and 3 to the right with respect thereto, and to an operative position illustrated in Fig. 7, will cause the channels 46 to move out of registration with the channel 29 and will enable communication to be had between the inner ends 43 of certain ones of the passages 42 and the outlet or discharge port 33 through the annular channel 30. Furthermore, the channels 45 will be moved to enable the inner ends 43 of certain other of the passages 42 to communicate with the pump 34 through the inlet passage 32 and the annular channel 29, whereby to admit fluid under pressure to desired portions of the fluid motor chamber 17. Means for moving the valve element 44 rotatively and axially comprises a conventional steering wheel or the like 47.

An elongated valve control element in the nature of a shaft 48 extends generally axially within the tubular valve element 44, and is provided at its inner end with a diametrically enlarged head 49 disposed within the splined opening 20 of the rotor 18. The head 49 is provided with axially extending teeth 50 which engage the splines of the opening 20 whereby the control shaft 48 is rotated in common with the rotor 18. Like the teeth 27 of the drive link 22 the teeth 50 are curved or generally arcuate in a direction longitudinally of the shaft 48 whereby to permit tilting movement of the shaft 48 away from the axis of the rotor 18. The head 49 defines an annular inner face or shoulder 51 that engages the annular collar 31 to limit axially outward movement of the shaft or coupling element 48 with respect to the valve body 3. It will be noted that the adjacent inner ends of the heads 21 and 49 are crowned and in abutting engagement so that each limits axially inward movement of the other during rotary and orbital movements of the rotor 18. At its opposite end, the control coupling element 48 is provided with an outer enlarged head in the nature of a ball segment 52 having a transverse opening 53 through which extends a transverse coupling pin 54. The opening 53 in the ball segment head 52 is elongated slightly in a direction axially of the shaft 48 to permit limited swinging movement of the shaft 48 with respect to the pin 54 about an axis normal to the axis of the pin 54. This swinging movement together with movement of the shaft or control element 48 on the axis of the pin 54 provides for a limited universal movement of the control element 48 in the same manner as that partaken of by the drive link 22. The opposite ends of the pin 54 are contained in generally triangular openings at diametrically opposed portions of the valve element 44 adjacent its extreme outer end. The openings 55 define cam surfaces 56 and 57 which engage the adjacent ends of the pin 54 to cause axial movement to be imparted to the valve element 44 in a direction inwardly with respect to the valve housing 3, when the steering wheel 47 is rotated in either direction from its neutral position shown in Fig. 2. With reference to Figs. 2 and 7 it will be seen that the valve element 44 is yieldingly biased toward its neutral position of Fig. 2 by a coil compression spring 58 interposed between an annular shoulder 59 on the coupling control element or shaft 48 and a stop shoulder in the nature of a snap link or the like 60 within the valve element 44.

The position of the splines of the opening 20 relative to the teeth 19, the teeth 50 to the pin 54 and the openings 55 and the channels 45 and 46, and these channels 45 and 46 relative to the inner ends 43 of the passages 42, are all predetermined and so disposed, that when the valve element 44 is rotated by the steering wheel 47 and caused to move axially during said rotation by engagement of the pin 54 with one or the other of the cam surfaces 56 or 57, that fluid under pressure will be caused to be introduced to a given portion of the chamber 17 to impart orbital movement to the rotor 18. At the same time, fluid will be caused to be discharged through other passages 41 and 42 from certain other portions of the chamber 17 to the outlet or discharge port 33 and from thence to the reservoir 37. As the rotor 18 partakes of its hypocycloidal movement within the chamber 17, the control element or shaft 48 is caused to rotate, and this rotation is transferred to the valve element 44 through the pin 54. Similar rotation is transsferred to the drive shaft element 5 through the drive link 22. During such rotation, the valve channels 45 and 46 are progressively moved into communication with other fluid passage portions 43 to cause progressive orbital and rotary movement of the rotor 18. Thus, orbital and rotary movement will continue as long as the operation keeps rotating the wheel 47 in the desired direction. Obviously, as soon as the operator stops rotation of the wheel 47, continued rotation of the control element or shaft 48 will cause the pin 54 to move toward the centers of the openings 55, and the spring 58 will move the valve element 44 axially to its position of Fig. 2 wherein a neutral or inoperative state is assumed at which point all rotary movement of the rotor ceases. With reference to Fig. 8 it will be seen that one or more of the valve channels 45 and 46 are in communication with a selected one of the fluid passages 42 at all times so that the valve element 44, during its rotation, operates much like a commutator to cause delivery of fluid under pressure to the proper portion of the chamber 17, and permit discharge of the fluid from other portions thereof to provide a smooth and uninterrupted movement of the rotor 18.

The connection between the valve element 44 and the control coupling element 48, the connections between the heads 49 and 21 through the spline of the rotor 18, and the pin 25 connecting the head 23 and the drive shaft element 5, all provide for a positive connection between the steering wheel 47 and the drive shaft element 5, so that when the pump 34 is rendered inoperative, the vehicle may be steered manually through these connections with little if any greater effort than would be required by a straight shaft connection between the wheel 47 and the drive shaft element 5.

For the purpose of utilizing the above described device as a continuously operating fluid pressure motor, it is only necessary that the valve element 44 be moved axially inwardly and rotated in the desired direction with respect to the control coupling shaft 48 to the extent permitted by the width of the opening 55, and then locked in this position by any suitable means, not shown. This done, the rotor will continue to move in the chamber 17 and rotate in a given direction as long as fluid under pressure is supplied to the chamber 17 by the pump 34. Obviously, reversing the direction of rotation of the drive shaft element 5, either when the apparatus is used as a steering motor, or as a continuously rotating device, is accomplished by merely turning the wheel 47 in the opposite direction from that in which it was originally turned, whereby to change the relationship between a given one or more of the valving channels 45 and 46 and respective ones of the fluid passages 42.

From the foregoing, it will be appreciated that my novel motor may be utilized as a fluid pump by connecting the drive shaft 5 to a source of rotary power, such as a motor, and connecting the conduits 35 and 38, one to a source of fluid, and the other to suitable fluid pressure operated apparatus. Obviously the drive shaft 5 will be rotated at a relatively slow speed, and the fluid will be displaced by orbital movement of the rotor 18 within the chamber 17 at a high delivery rate but at a relatively low pressure, inasmuch as the rotor 18 makes a complete orbital pumping cycle for each ⅙ revolution imparted thereto by the drive shaft 5 and the drive link 22.

While I have shown and described a commercial embodiment of my novel apparatus, it will be understood that the same is capable of modification, and that modification may be made without departure from the spirit and scope of the invention as defined in the claims.

What I claim is:

1. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being movable in an orbit about the axis of the other thereof to produce relative rotation between said members, a pair of cooperating relatively movable valve elements one of which is coupled to said internally toothed member and which defines fluid passages communicating with said chamber, the other of said valve elements defining fluid passages communicating with different ones of the fluid passage in said one of the valve elements upon relative movement therebetween, one of said valve elements further defining inlet and outlet ports communicating with the fluid passages therein and adapted to be coupled to a source of fluid pressure, and means operatively coupling said externally toothed member to a cooperating one of said valve elements to cause relative rotation between said valve elements responsive to said relative orbital movement between said toothed members.

2. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being relatively stationary, the other thereof being relatively movable in an orbit about the axis of said one thereof to produce relative rotation between said members, a relatively stationary valve element and a relatively movable valve element one of which is coupled to said internally toothed member and which defines fluid passages communicating with said chamber, the other of said valve elements defining fluid passages communicating with different ones of the fluid passages in said one of the valve elements upon relative movement therebetween, one of said valve elements further defining inlet and outlet ports communicating with the fluid passages therein and adapted to be coupled to a source of fluid pressure, and means operatively coupling said externally toothed member to a cooperating one of said valve elements to cause relative rotation between said valve elements responsive to said orbital movement of one of said toothed members.

3. In a fluid pressure operated motor, an internally toothed member defining the outer wall of a chamber, a cooperating externally toothed member having a less number of teeth than the internally toothed member and disposed eccentric thereof in said chamber in meshing engagement therewith, said externally toothed member being movable in an orbit about the axis of said internally toothed member to produce relative rotation between said members, a pair of cooperating relatively movable valve elements one of which is coupled to said internally toothed member and which defines fluid passages communicating with said chamber, the other of said valve elements defining fluid passages communicating with different ones of the fluid passages in said one of the valve elements upon relative movement therebetween, one of said valve elements further defining inlet and outlet ports communicating with the fluid passages therein and adapted to be coupled to a source of fluid pressure, and means operatively coupling said externally toothed member to a cooperating one of said valve elements to cause relative rotation between said valve elements responsive to said orbital movement of the externally toothed member.

4. In a fluid pressure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative thereto, a relatively stationary valve body connected to said stator, a cooperating relatively movable valve element mounted for axial and rotary movement with respect to said valve body, said valve body defining fluid passages communicating with said movable valve element and said chamber, said valve body further defining inlet and outlet ports adapted to be coupled to a source of fluid pressure, said inlet and outlet ports communicating with different ones of said fluid passages upon axial and rotary movement of said movable element in one direction from an inoperative position wherein said inlet port is in communication with the outlet port through said movable valve element, a control coupling element operatively connecting said movable valve element to said rotor for common rotation therewith, a drive shaft element, means journaling said drive shaft element for common rotation with said rotor, and a drive link operatively coupling said rotor to said drive shaft, whereby rotary movement of said rotor, caused by engagement thereof with said stator during orbital movement of the rotor, is transferred to said drive shaft.

5. In a fluid pressure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative to said stator, a relatively stationary valve body connected to said stator, a cooperating relatively movable valve element mounted in said valve body for axial and rotary movement therein on the axis of said stator, said valve body defining fluid passages communicating with said movable valve element and said chamber, said valve body further defining inlet and outlet ports adapted to be coupled to a source of fluid pressure, said inlet and outlet ports connecting with different ones of said fluid passages upon axial and rotary movement of said movable element in one direction from an inoperative position wherein said inlet port is in communication with the outlet port through said movable valve element, means for imparting rotary and axial movement to said movable valve element, a control coupling element operatively connecting said movable valve element to said rotor for common rotation therewith, a drive shaft element, means journaling said drive shaft element for rotation on the common axis of said stator and movable valve element, and a drive link operatively coupling said rotor to said drive shaft, whereby rotary movement of said rotor, caused by engagement thereof with said stator during orbital movement of the rotor, is transferred to said drive shaft.

6. In a fluid pressure operated motor, a casing including an intermediate section and opposite end sections cooperating to define a chamber, said intermediate section comprising an annular internally toothed stator, a cooperating externally toothed rotor having a less number of teeth than said stator and disposed in said chamber eccentric to said stator and in meshing engagement therewith for rotary and orbital movements relative to said stator, one of said end sections comprising a valve body, a valve element mounted in said body for axial and rotary movement with respect thereto on the axis of said stator, said valve body defining fluid passages communicating with said movable valve element and with said chamber between the internal teeth of said stator, said valve body further defining inlet and outlet ports adapted to be coupled to a source of fluid pressure, said inlet and outlet ports communicating with different ones of said fluid passages upon axial and rotary movement of said valve element in one direction from an inoperative position wherein said inlet port is in communication with the outlet port through said valve element, means for imparting rotary and axial movement to said valve element, a control coupling element operatively connecting said valve element to said rotor for common rotation therewith, the other of said end casing sections providing a bearing, a drive shaft element journaled in said bearing on the common axis of said stator and valve element, and a drive link operatively coupling said rotor to said drive shaft, whereby rotary movement of said rotor, caused by engagement thereof with said stator during orbital movement of the rotor, is transferred to said drive shaft.

7. In a fluid pressure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative to said stator, a relatively stationary valve body connected to said stator, a cooperating relatively movable valve element mounted in said valve body for axial and rotary movement therein on the axis of said stator between inoperative and operative positions, yielding means urging said valve element toward its inoperative position, said valve body defining fluid passages communicating with said movable valve element, and said chamber, said valve body further defining inlet and outlet ports adapted to be coupled to a source of fluid pressure, said inlet and outlet ports communicating with different ones of said fluid passages upon axial and rotary movements of said movable element in one direction from its inoperative position wherein said inlet port is in communication with the outlet through said movable valve element, mechanism for imparting rotary and axial movements to said valve element against bias of said yielding means, a control coupling element operatively connecting said valve element to said rotor for common rotation therewith, a drive shaft element, means journaling said drive shaft element for rotation on the common axis of said stator and movable valve element, and a drive link operatively coupling said rotor to said drive shaft, whereby rotary movement of said rotor, caused by engagement thereof with said stator during orbital movement of the rotor, is transferred to said drive shaft.

8. In a fluid pressure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative to said stator, a relatively stationary valve body connected to said stator, a cooperating relatively movable valve element mounted in said valve body for axial and rotary movement therein on the axis of said stator, said valve body defining fluid passages communicating with said movable valve element and said chamber, said valve body further defining inlet and outlet ports adapted to be coupled to a source of fluid pressure, said inlet and outlet ports communicating with different ones of said fluid passages upon axial and rotary movement of said movable element in one direction from an inoperative position wherein said inlet port is in communication with the outlet port through said movable valve element, means for imparting rotary and axial movement to said movable valve element, a control coupling element connected at one end to said rotor for common rotation therewith and for tilting movements with respect to the axis of said rotor, means connecting said relatively movable valve element to the opposite end of said control coupling element for limited axial and rotary movements relative thereto, a drive shaft element, means journaling said drive shaft element for rotation on the common axis of said stator and movable valve element, and a drive link operatively coupling said rotor to said drive shaft, whereby rotary movement of said rotor, caused by engagement thereof with said stator during orbital movement of the rotor, is transferred to said drive shaft.

9. The structure defined in claim 5 in which said drive link is connected to said rotor and drive shaft element for common rotation therewith and for tilting movement with respect to the axes of said rotor and drive shaft element, said control coupling element and drive link being anchored against axial movement relative to said rotor.

10. In a fluid pressure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative to said stator, a relatively stationary valve body connected to said stator, said valve body having a central opening coaxial with the stator, a cooperating tubular valve element mounted in said central opening for axial and rotary movements between inoperative and operative positions, said valve body defining fluid passages communicating with said movable valve element and said chamber, said valve body further defining inlet and outlet ports adapted to be coupled to a source of fluid pressure, said inlet and outlet ports connecting with different ones of said fluid passages upon axial and rotary movement of said movable element in one direction from an inoperative position wherein said inlet port is in communication with the outlet port through said tubular valve element, a control coupling element extending generally longitudinally within said tubular valve element and having its inner end coupled to said rotor for common rotation therewith and for tilting movements relative to the axis of said rotor and anchored against axial movement relative to said rotor, means connecting the outer end of said coupling element to said tubular valve element for limited relative axial and rotary movements, yielding means interposed between said coupling element and said tubular valve element urging said valve element toward its inoperative position, a drive shaft element, means journaling said drive shaft element for rotation on the common axis of said stator and movable valve element, and a drive link operatively coupling said rotor to said drive shaft, whereby rotary movement of said rotor, caused by engagement thereof with said stator during orbital movement of the rotor, is transferred to the drive shaft.

11. The structure defined in claim 7 in which said movable valve element defines a cam surface, said control coupling element including a cam follower urged toward engagement with said cam surface by said yielding means and causing said valve element to move axially in one direction responsive to rotary movement of said valve element in a given direction, and in further combination with means for imparting limited rotary movement to said movable valve element independently of said rotor.

12. In a fluid pressure operated motor, a casing including an intermediate section and opposite end sections cooperating to define a chamber, said intermediate section comprising an annular internally toothed stator, a cooperating externally toothed rotor having a less number of teeth than said stator and disposed in said chamber eccentric to said stator and in meshing engagement therewith for rotary and orbital movements relative to said stator, said rotor having an internally toothed central opening extending axially therethrough, one of said end sections comprising a valve body, a valve element mounted in said body for axial and rotary movements with respect thereto on the axis of said stator, said valve body defining fluid passages communicating with said movable valve element and with said chamber between the internal teeth of said stator, said valve body further defining inlet and outlet ports adapted to be coupled to a source of fluid pressure, said inlet and outlet ports communicating with different ones of said fluid passages upon axial and rotary movement of said valve element in one direction from an inoperative position wherein said inlet port is in communication with the outlet port through said valve element, means for imparting rotary and axial movements to said valve element, an elongated control coupling element connected at its outer end to said valve element for limited axial movement relative thereto and for tilting movements relative to the axis of the valve element, a toothed head on the inner end of said coupling element having meshing engagement with the internal teeth in the central opening of said rotor, the other of said end casing sections providing a bearing, a drive shaft element journaled in said bearing on the common axis of said stator and said valve element, and a drive link connected at its outer end to said drive shaft element for common rotation therewith and for tilting movements relative to the axis thereof, the inner end of said drive link defining a toothed head having meshing engagement with the internal teeth in the central opening of said rotor adjacent the head on said control coupling element, the teeth on said heads being longitudinally arcuate to permit tilting of said coupling element and said link with respect to the axis of said rotor, the adjacent ends of said heads being substantially in abutting engagement, the opposite ends of said heads each engaging an adjacent wall surface of said chamber whereby to limit longitudinal movements of said coupling element and said drive link away from each other, rotary movement of said rotor, caused by engagement thereof with said stator during orbital movement of the rotor, being transferred to said drive shaft element by said drive link.

13. In a fluid pressure device, an internally toothed member defining the outer wall of a chamber, a cooperating externally toothed member having a less number of teeth than the internally toothed member and disposed eccentric thereof in said chamber in meshing engagement therewith, one of said members moving in an orbit about the axis of the other thereof during relative rotation between said members, a pair of cooperating relatively movable valve elements one of which is connected to said internally toothed member and which defines fluid passages communicating with said chamber, the other of said valve elements defining fluid passages communicating with different ones of the fluid passages in said one of the valve elements upon relative movement therebetween, one of said valve elements further defining inlet and outlet ports communicating with the fluid passages therein, said inlet port being adapted to be connected to a source of fluid, and means operatively coupling said externally toothed member to a cooperating one of said valve elements to impart relative rotation between said valve elements responsive to said relative orbital and rotary movement between said toothed members.

14. In a fluid presure operated motor, an internally toothed stator defining one wall of a chamber, a cooperating externally toothed rotor having a less number of teeth than said stator and disposed eccentrically thereof in said chamber and in meshing engagement with said stator for rotary and orbital movements relative thereto, a relatively stationary valve body connected to said stator, a cooperating relatively movable valve element mounted in said valve body for limited movement relative to said rotor and for common rotary movements therewith, said valve body defining fluid passages communicating with said movable valve element and spaced portions of said chamber, said valve body further defining inlet and outlet ports, said inlet port being adapted to be coupled to a source of fluid pressure, said inlet and outlet ports communicating with different ones of said fluid passages upon rotary movement of said movable valve element, a control coupling element operatively connecting said movable valve element to said rotor for common rotation therewith and permitting said limited rotary movement of said valve element relative to said rotor, a drive shaft element, means journaling said drive shaft element for common rotation with said rotor, and a drive link operatively coupling said rotor to said drive shaft, whereby rotary movement of said rotor, caused by engagement thereof with said stator during orbital movement of the rotor, is transferred to said drive shaft.

15. In a fluid presure device, an internally toothed member defining the outer wall of a chamber, a cooperating externally toothed member having a less number of teeth than the internally toothed member and disposed eccentric thereof in said chamber in meshing engagement therewith, one of said members moving in an orbit about the axis of the other thereof during relative rotation between said members, valve means including cooperating relatively movable valve elements one of which is operatively coupled to said internally toothed member and which defines fluid pasages in communication with said chamber, another of said valve elements defining fluid passages communicating with different ones of the fluid passages in said one of the valve elements upon relative rotation therebetween, said valve means defining inlet and outlet ports communicating with different ones of said fluid passages and adapted to be coupled to a source of fluid, and means operatively coupling said externally toothed member to a cooperating one of said valve elements to cause relative movement between said valve elements responsive to said relative orbital movement between said toothed members.

No references cited.